*H. Willard*
*Removing Stumps by Combustion.*
*N°. 94264.  Patented Aug. 31, 1869.*

Witnesses;
Isaac H. Wurton
Edward Taggart

Inventor;
Henderson Willard

United States Patent Office.

HENDERSON WILLARD, OF GRAND RAPIDS, MICHIGAN, ASSIGNOR TO HIMSELF AND JOSEPH WALKER, OF SAME PLACE.

Letters Patent No. 94,264, dated August 31, 1869.

IMPROVED MODE OF REMOVING STUMPS.

The Schedule referred to in these Letters Patent and making part of the same.

To all whom it may concern:

Be it known that I, HENDERSON WILLARD, of the city of Grand Rapids, in the county of Kent, in the State of Michigan, have invented a new Method of Preparing Stumps for Combustion; and I do declare that the following is a full and exact description thereof, reference being had to the accompanying drawings, and the letters of reference marked thereon.

The nature of my invention consists in first boring a hole in a stump from top to root, vertically or diagonally, to receive a priming of penetrating and combustible matter, and afterward intersecting this hole by making a hole or opening in the side of the stump, near the ground, to cause a draught through the stump, when ignited at this opening or hole, near the ground.

In the annexed drawings, making a part of this specification—

Figure 1:
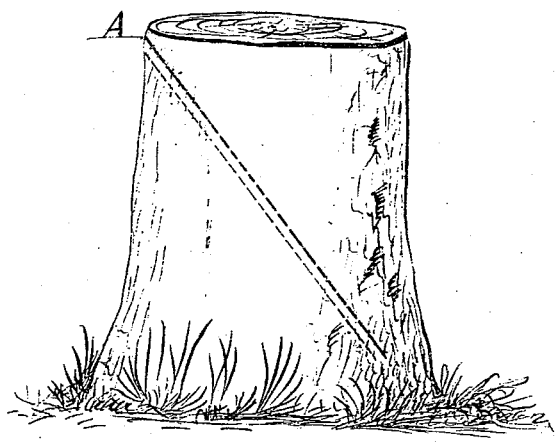
Figure 2:
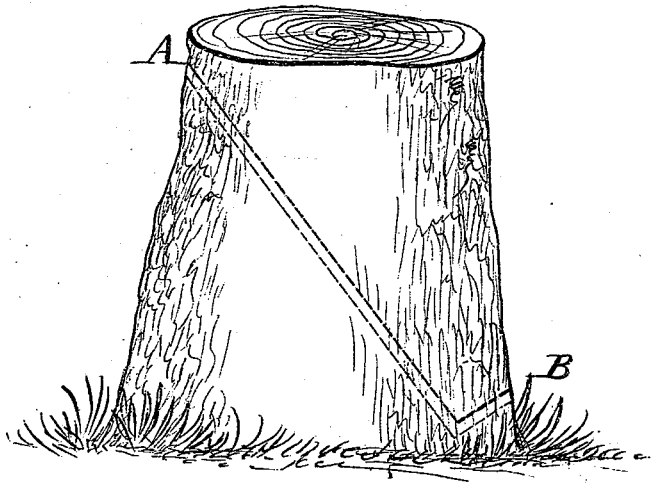

Figure 1 represents a stump, which has been bored diagonally, to receive a priming of penetrating and combustible matter, as seen at A, and Figure 2 represents the same stump, after the priming has been absorbed and the hole or opening B has been made near the ground, in the side of the stump intersecting the hole A, for the purpose of causing a draught through the hole A, when fire is applied to the stump at the hole or opening B.

As many holes A and B may be made as thought desirable, and any sufficiently penetrating and combustible substance may be used for priming.

Fire should be applied at B, that the draught may carry the flame through the hole A, until the stump is consumed.

Having thus described my invention,

What I claim as new, and desire to secure by Letters Patent, is—

The holes A and B made in a stump, substantially as herein described, and for the purposes fully set forth.

In testimony that I claim the foregoing, I have hereunto set my hand, this 10th day of April, 1869.

HENDERSON WILLARD.

Witnesses:
   ISAAC H. NEWTON,
   EDWARD TAGGERT.